(12) United States Patent
Locovei et al.

(10) Patent No.: US 12,117,355 B2
(45) Date of Patent: Oct. 15, 2024

(54) SEALING ELEMENT FOR A PRESSURE SENSOR ASSEMBLY FOR A MOTOR VEHICLE AND PRESSURE SENSOR ASSEMBLY

(71) Applicant: Continental Automotive Technologies GmbH, Hannover (DE)

(72) Inventors: Cosmin Ion Locovei, Timisoara (RO); Gabriel Goron, Timisoara (RO); Cosmin Jejeran, Timisoara (RO); Daniel-Adrian Pascu, Mosnita Noua (RO); Telmo Glaser, Regensburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 205 days.

(21) Appl. No.: 17/758,547

(22) PCT Filed: Dec. 9, 2020

(86) PCT No.: PCT/EP2020/085150
§ 371 (c)(1),
(2) Date: Jul. 8, 2022

(87) PCT Pub. No.: WO2021/148189
PCT Pub. Date: Jul. 29, 2021

(65) Prior Publication Data
US 2023/0049086 A1 Feb. 16, 2023

(30) Foreign Application Priority Data
Jan. 23, 2020 (EP) .................................. 20465501

(51) Int. Cl.
*G01L 19/06* (2006.01)

(52) U.S. Cl.
CPC .................. *G01L 19/0672* (2013.01)

(58) Field of Classification Search
CPC .......................... G01L 19/067; B81B 7/0051
See application file for complete search history.

(56) References Cited

U.S. PATENT DOCUMENTS

| 9,470,595 B2 * | 10/2016 | Ramsay ............... H05K 5/0078 |
| 2004/0083817 A1 * | 5/2004 | Nomura ................. G01D 11/30 |
| | | 73/756 |

(Continued)

FOREIGN PATENT DOCUMENTS

| DE | 4447513 A1 | 2/1996 |
| JP | H1164145 A | 3/1999 |

OTHER PUBLICATIONS

European Search Report mailed on Jul. 30, 2020 for the counterpart European Patent Application No. 20817401.1.

(Continued)

*Primary Examiner* — Patrick Assouad
*Assistant Examiner* — Mark A Shabman

(57) ABSTRACT

A sealing element for a pressure sensor assembly for a motor vehicle for crash detection. The sealing element has a through-recess running in an axial direction and a main body having an outer wall and an inner wall surrounding the through-recess, as well as having a lower axial end and an upper axial end, wherein the inner wall of the main body has a first wall section widening towards the lower axial end, wherein the lower axial end of the main body faces the pressure sensor housing in the assembled state, and wherein the first wall section forms a contact surface for contact with the pressure sensor housing, on which at least sections of the pressure sensor housing rest in the assembled state.

11 Claims, 2 Drawing Sheets

(56) References Cited

U.S. PATENT DOCUMENTS

| | | | |
|---|---|---|---|
| 2005/0186703 A1* | 8/2005 | Weiblen | B81B 7/0051 |
| | | | 438/106 |
| 2010/0162820 A1* | 7/2010 | Dannhauer | G01L 19/0672 |
| | | | 428/161 |
| 2013/0335919 A1 | 12/2013 | Shinoda | |
| 2018/0057355 A1* | 3/2018 | Osawa | G01L 19/003 |
| 2018/0087990 A1* | 3/2018 | Osawa | G01L 19/147 |
| 2018/0087991 A1* | 3/2018 | Osawa | G01L 19/0038 |
| 2018/0283970 A1 | 10/2018 | Osawa et al. | |
| 2020/0326255 A1* | 10/2020 | Takimoto | G01L 19/142 |

OTHER PUBLICATIONS

The International Search Report and the Written Opinion of the International Searching Authority mailed on Jan. 19, 2021 for the counterpart PCT Application No. PCT/EP2020/085150.

\* cited by examiner

SEALING ELEMENT FOR A PRESSURE SENSOR ASSEMBLY FOR A MOTOR VEHICLE AND PRESSURE SENSOR ASSEMBLY

CROSS-REFERENCE TO RELATED APPLICATIONS

This application is a National Stage Application under 35 U.S.C. § 371 of International Patent Application No. PCT/EP2020/085150 filed on Dec. 9, 2020, which claims priority from European Patent Application No. EP 20465501.3 filed in the European Patent Office on Jan. 23, 2020, the disclosures of which are herein incorporated by reference in their entireties.

BACKGROUND

1. Field

Embodiments of the present application relate to a sealing element for a pressure sensor assembly for a motor vehicle for crash detection. Furthermore, the embodiments of the present application relate to a pressure sensor assembly comprising a sealing element of this type.

2. Description of Related Art

Pressure sensor assemblies in motor vehicles are now widespread. Such a pressure sensor assembly usually comprises a pressure sensor unit which is arranged inside an assembly housing, which pressure sensor unit comprises, for example, a membrane inside a pressure sensor housing as a sensing element. When the pressure sensor unit or the sensing element of a pressure sensor assembly is subjected to a pressure, in particular air pressure, the membrane reacts by changing its shape. This change in shape causes one or more properties of electronic components, in particular resistors, on the membrane to change. These changing properties can then be measured and, consequently, the pressure can then be determined from this.

Such a pressure sensor assembly is usually utilized in a motor vehicle as part of a safety system for crash detection. The pressure sensor assembly continually measures a pressure in a largely closed cavity and sends the data to a control unit for an airbag. To this end, such a pressure sensor assembly is utilized in particular in the interior of a vehicle side door or in a comparable cavity of the motor vehicle and is, for example, assembled on an opening in a wall of such a cavity, wherein the pressure in the cavity is supplied via a pressure inlet of the assembly housing to the pressure sensor unit and, ultimately, to the sensing element. The pressure increase that occurs in the cavity in the event of a crash is captured and evaluated and, based thereon, a side impact with the motor vehicle in particular can be detected and suitable protective mechanisms for the vehicle occupants, for example side airbags, can be triggered.

To ensure that the pressure prevailing inside the assembly housing does not influence the pressure measurement and, if at all possible, no impurities or moisture can penetrate said assembly housing, an air channel leading from the pressure inlet of the assembly housing to the pressure sensor unit and, in particular, the sensing element of the pressure sensor unit is regularly sealed with respect to the inside of the assembly housing by means of a sealing element, so that the pressure sensor unit or the sensing element is acted upon by the ambient air in the cavity and, therefore, by the corresponding air pressure in the cavity. However, in the case of conventional sealing elements, it is in particular disadvantageous that the latter frequently do not guarantee an adequate sealing function in the assembled state and/or, with their surface, also at least partially cover or overlay relevant regions of the pressure sensor unit, to which the pressure is actually to be supplied, as a result of which the pressure detection and determination are adversely affected.

SUMMARY

Aspects of the embodiments of the present application provide a sealing element for a pressure sensor assembly for a motor vehicle for crash detection as well as a corresponding pressure sensor assembly, which makes it possible to detect the pressure in the most reliable and robust manner possible.

The sealing element according to an embodiment for a pressure sensor assembly for a motor vehicle for crash detection with a pressure sensor unit inside an assembly housing, wherein the pressure sensor unit comprises a sensing element arranged inside a pressure sensor housing for detecting an air pressure, wherein the pressure sensor housing has a pressure supply opening for supplying the air pressure from a pressure inlet of the assembly housing to the sensing element, can be arranged between the pressure sensor housing and an assembly housing wall, in order to seal the pressure supply opening in relation to the inside of the assembly house, in such a way that the sealing element encloses the pressure supply opening and fluidically connects the pressure inlet with the pressure supply opening, wherein the sealing element has a through-recess running in an axial direction and comprises a main body having an outer wall and an inner wall surrounding the through-recess, as well as having a lower axial end and an upper axial end, wherein the inner wall of the main body has a first wall section widening towards the lower axial end, and wherein the lower axial end of the main body faces the pressure sensor housing in the assembled state.

Aspects of the embodiments proceed from the consideration that the pressure detection essentially depends on the supply of the pressure to the pressure sensor unit or the sensing element and, therefore, in particular on the pressure conveyance within the assembly sensor housing towards the pressure supply opening of the pressure sensor housing, wherein great importance is attached to the correct sealing of the pressure supply opening in that the pressure supply opening is sealed as completely as possible in relation to the inside of the assembly housing and the pressure supply opening is not covered or overlaid by the surface of the corresponding sealing element. Aspects of the embodiments also proceed from the consideration that a corresponding sealing element has to be designed as optimally as possible for a specific installation situation of the components of the pressure sensor assembly, but also has to take into account and compensate for production and installation tolerances of the corresponding components. Aspects of the embodiments therefore provide, in particular, that the inner wall of the main body of the sealing element has a first wall section widening towards the lower axial end of the main body, wherein the lower axial end of the main body faces the pressure sensor housing in the assembled state, that is to say that in the assembled state the first wall section is formed on the end of the inner wall of the main body mounted on the pressure sensor housing. Such a configuration can ensure or at least significantly increase the probability that even when relatively large production and installation tolerances occur, the sealing element around the pressure supply opening rests in as complete a sealing manner as possible in particular on the pressure sensor housing and, in this case, the pressure supply opening is not covered or overlaid or is only covered or overlaid to an insignificant extent by the surface of the sealing element, as a result of which a necessary pressure conveyance ultimately to the sensing element is guaranteed.

An advantage of the configuration according to the aspects of the embodiments is that it provides a sealing element for a pressure sensor assembly for a motor vehicle for crash detection, which makes it possible to detect the pressure in the most reliable and robust manner possible.

The main body can in particular have a circular, oval, polygonal or rectangular cross-sectional shape.

The first wall section of the inner wall of the main body is arranged in the region of and in particular directly on the lower axial end of the main body.

The inner wall of the main body advantageously has a first wall section continuously widening towards the lower axial end.

The through-recess of the sealing element is in particular formed to convey, in the assembled state of the sealing element, the air pressure from a pressure inlet of the assembly housing through the sealing element to the pressure supply opening of the pressure sensor housing and, ultimately, to the sensing element. In this case, the through-recess can be fluidically connected with the pressure inlet, directly or indirectly, for example via a pressure channel passing through an assembly housing wall.

The pressure supply opening is expediently formed on a pressure sensor housing cover which, in the context of the embodiments, can be understood to be a part of the pressure sensor housing.

The pressure sensor housing of the pressure sensor unit has at least one pressure supply opening. However, it is also possible that the pressure sensor housing has more than one pressure supply opening, in particular two pressure supply openings. In the case of more than one pressure supply opening, the sealing element is in particular arranged, in the assembled state, in such a way that the sealing element encloses all the pressure supply openings as far as possible and fluidically connects the pressure inlet with the pressure supply openings. In this case, the sealing element expediently rests on at least one of the pressure supply openings, in as complete a sealing manner as possible, and at least this one pressure supply opening is not covered or overlaid or is only covered or overlaid to an insignificant extent by the surface of the sealing element.

The first wall section forms a contact surface for contact with the pressure sensor housing, on which at least sections of the pressure sensor housing rest in the assembled state. The fact that the first wall section widens towards the lower axial end of the main body in the unassembled state makes possible a sufficiently secure sealing function, wherein, for this purpose, a relatively small corresponding surface on the pressure sensor housing is in contact with the surface of the sealing element and, consequently, is covered by the surface of the sealing element. In particular, this makes possible a high variability with respect to an installation position of the sealing element in relation to the position of the pressure sensor housing and, in particular, to the position of the pressure supply opening of the pressure sensor housing, in which a sufficiently secure sealing function is guaranteed and the pressure supply opening is prevented from being covered or overlaid.

In an advantageous embodiment, the inner wall of the main body has a second wall section widening, advantageously continuously widening, towards the first wall section, wherein the second wall section has a second degree of the widening which differs from a first degree of the widening of the first wall section. That is to say, the second wall section in particular directly adjoins the first wall section. Such a configuration having two wall sections with a different degree of the widening further promotes the variability of the installation position of the sealing element and, therefore, a large tolerance range. The first degree of the widening is preferably larger than the second degree of the widening. In this way, the probability is, in particular, further increased that, in the assembled state, the pressure supply opening is not covered or overlaid by the surface of the sealing element.

In a further advantageous embodiment, the main body is substantially formed as a hollow cylinder, wherein the outer wall is formed as an outer peripheral wall and the inner wall is formed as an inner peripheral wall, and wherein the first wall section of the inner peripheral wall widens conically towards the lower axial end. This represents a particularly suitable configuration of the main body and of the first wall section, which makes it possible to manufacture and assemble the sealing element relatively simply and to guarantee a sufficiently reliable sealing function, while preventing the pressure supply opening from being covered or overlaid by the surface of the sealing element.

The second wall section of the inner peripheral wall widens, in a further advantageous embodiment, conically towards the first wall section, wherein the second wall section has a second opening angle which differs from a first opening angle of the first wall section, and wherein the first opening angle is preferably larger than the second opening angle.

In a further advantageous embodiment, the first opening angle is selected from a range of 90° to 160°, preferably from a range of 120° to 135°. Such a first opening angle of the first wall section is particularly suitable for guaranteeing a secure sealing function, wherein, for this purpose, a particularly small corresponding surface on the pressure sensor housing is in contact with the surface of the sealing element and is, consequently, covered or overlaid by the sealing element.

The second opening angle is, in a further advantageous embodiment, selected from a range of 30° to 90°, preferably from a range of 55° to 70°. Such a second opening angle of the second wall section guarantees, to a particularly high extent, that the pressure supply opening is not covered or overlaid or is only covered or overlaid to an insignificant extent by the surface of the sealing element, in the assembled state.

In a further advantageous embodiment, the main body has an elastic form. The main body advantageously consists of an elastic material. Thanks to the elastically deformable main body, the sealing element can be braced between the pressure sensor housing and an assembly housing wall and can therefore be arranged in a position which is as fixed as possible. In addition, the elastic deformability of the main body further contributes to the fact that, in the assembled state of the sealing element, the main body is contacted with the pressure sensor housing such that a certain deformation occurs in such a way that the pressure supply opening being covered or overlaid by the surface of the sealing element is prevented as far as possible, or the extent of the coverage or overlaying is at least reduced.

In a further advantageous embodiment, the sealing element comprises a substantially plate-shaped support element which has a planar support surface for supporting the sealing element on the assembly housing wall. In the assembled state of the sealing element, the support element with its support surface is consequently in sealing contact with the assembly housing wall, which has in particular a planar configuration in the region of the support surface.

In this case, the support element advantageously adjoins the upper axial end of the main body, wherein the support surface is formed on the surface of the support element facing away from the axial end of the main body.

In a further advantageous embodiment, the support element has a substantially rectangular basic shape, preferably a substantially square basic shape. In this case, the corners of the support element expediently have a rounded configuration. The section of the through-recess of the sealing element running through the support element lies in particular in the center of the support element. Thanks to such a configuration, the support element and, therefore, the sealing element as a whole are relatively simple and inexpensive to manufacture and assemble.

Advantageously, the through-recess in the support element has a first inlet section widening, preferably continuously widening, towards the support surface. In an advantageous embodiment, the through-recess in the support element has a first inlet section widening conically towards the support surface. In the assembled state of the sealing element, the first inlet section consequently faces the assembly housing wall. The first inlet section preferably faces an outlet opening of a pressure channel that passes through the assembly housing wall and fluidically connects the pressure inlet of the assembly housing with the through-recess of the sealing element; the outlet opening of the pressure channel and at least the first inlet section of the through-recess preferably lie coaxially with respect to one another. This configuration of the through-recess in the support element makes it possible for the air pressure to be reliably supplied from the pressure inlet of the assembly housing via the through-recess of the sealing element to the sensing element of the pressure sensor unit within a large tolerance range with regard to production and installation tolerances.

In a further advantageous embodiment, the through-recess in the support element in a second inlet section is configured as a cylindrical bore, wherein the second inlet section adjoins the upper axial end of the main body. The second inlet section preferably lies directly between the first inlet section of the support element and the upper axial end of the main body, in an expedient embodiment directly between the first inlet section of the support element and the second wall section of the main body, as a result of which the cylindrical bore consequently fluidically connects the first inlet section of the support element with the section of the through-recess formed in the main body.

In a further advantageous embodiment, a third opening angle of the first inlet section is selected from a range of 90° to 160°, preferably from a range of 120° to 135°. Such a third opening angle of the first inlet section represents a particularly suitable compromise between a sufficiently secure sealing function and a sufficiently large tolerance range with regard to production and installation tolerances.

In a further advantageous embodiment, the first inlet section comprises a second inlet section region having a third opening angle and a first inlet section region having a fourth opening angle which differs from the third opening angle, wherein the first inlet section region is formed on an axial end region of the first inlet section facing away from the lower axial end of the main body, and wherein the fourth opening angle is preferably larger than the third opening angle. A first inlet section configured in such a way with a first inlet section region, which has a preferably larger, fourth opening angle which differs from the third opening angle of the second inlet section region, facilitates the manufacture of the sealing element by means of a corresponding tool, in particular an injection mold, which furthermore has a positive effect in terms of the production and installation tolerances and, therefore, the sealing function.

In a further advantageous embodiment, the sealing element has an integral form. This facilitates the manufacture and assembly of the sealing element and has a positive effect on the overall sealing function and the durability or service life of the sealing element. The sealing element advantageously has an elastic form overall.

Aspects of the embodiments additionally comprise a pressure sensor assembly for a motor vehicle for crash detection with a pressure sensor unit inside an assembly housing, wherein the pressure sensor unit comprises a sensing element arranged inside a pressure sensor housing for detecting an air pressure, wherein the pressure sensor housing has a pressure supply opening for supplying the air pressure from a pressure inlet of the assembly housing to the sensing element, wherein a sealing element according to an embodiment is arranged between the pressure sensor housing and an assembly housing wall, in order to seal the pressure supply opening in relation to the inside of the assembly house, in such a way that the sealing element encloses the pressure supply opening and fluidically connects the pressure inlet with the pressure supply opening.

The advantages and preferred embodiments described for the sealing element according to an embodiment also apply accordingly to the pressure sensor assembly according to an embodiment.

The pressure sensor assembly preferably has a pressure channel that passes through the assembly housing wall and fluidically connects the pressure inlet of the assembly housing with the through-recess of the sealing element, wherein an outlet opening of the pressure channel and the through-recess preferably lie substantially coaxially with respect to one another.

BRIEF DESCRIPTION OF THE DRAWINGS

Exemplary embodiments are described in greater detail below with reference to a drawing, wherein.

Corresponding parts are always provided with the same reference numerals in all figures.

DETAILED DESCRIPTION

Figure 1:
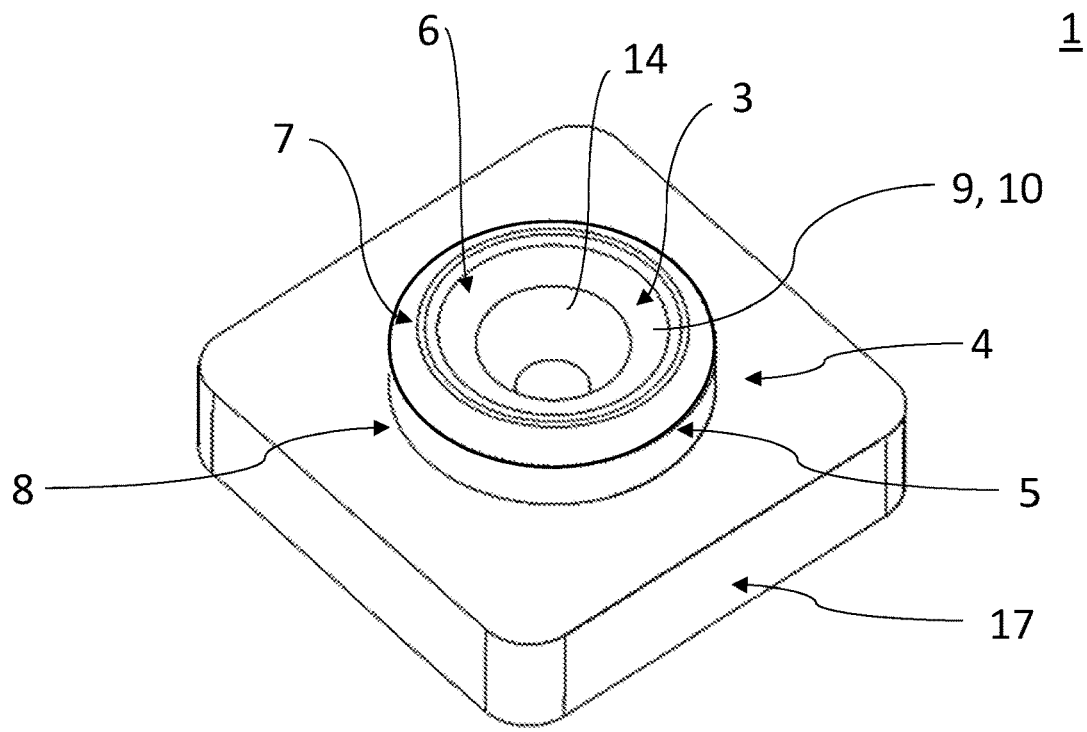
FIG. 1 shows a perspective representation of a sealing element in a view from below.
Figure 2:
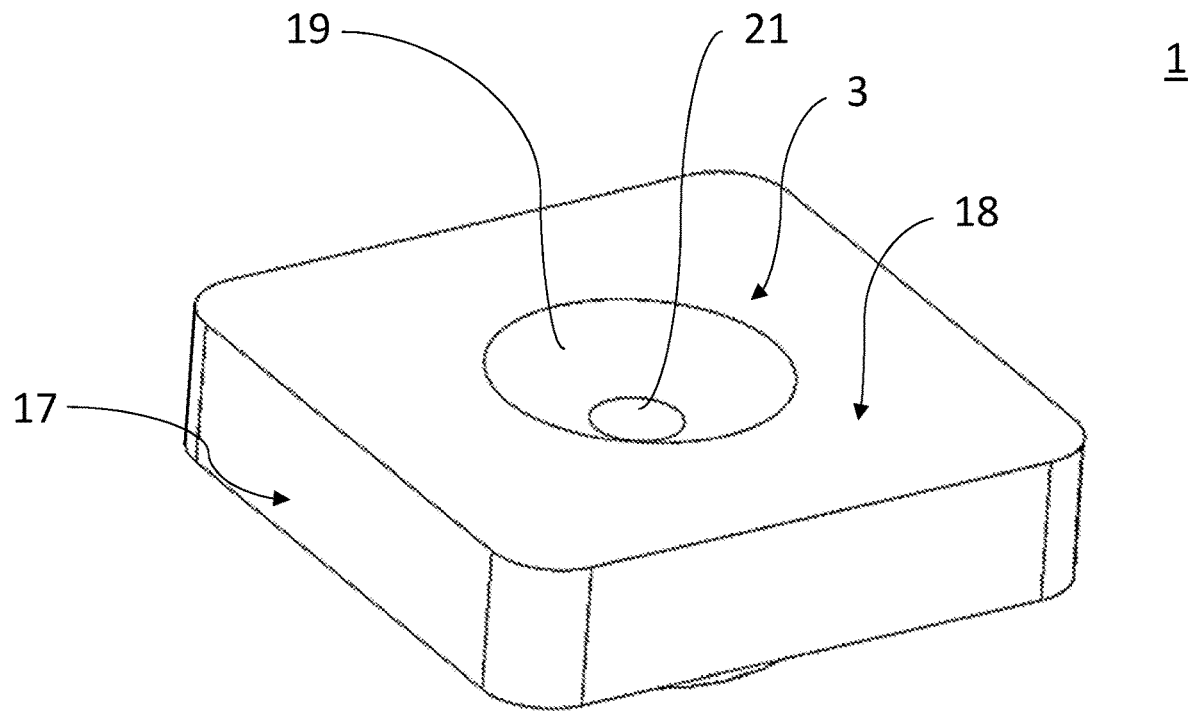
FIG. 2 shows a perspective representation of the sealing element according to FIG. 1 in a view from above.
Figure 3:
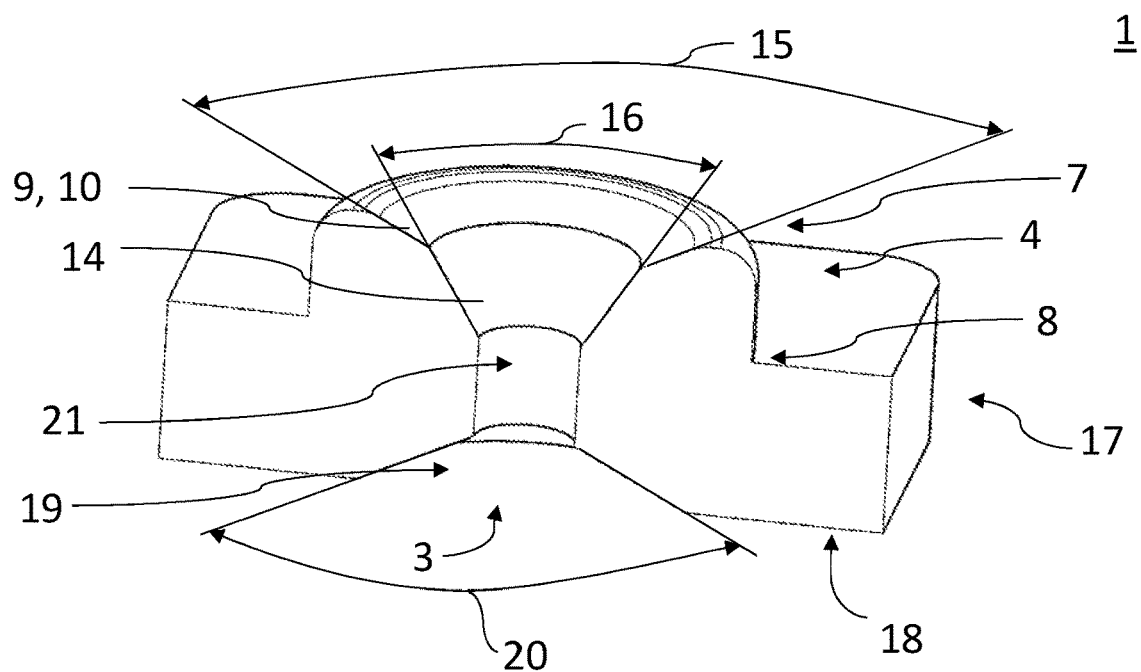
FIG. 3 shows a perspective representation of the sealing element according to FIG. 1 in a cross-section.

In FIGS. 1 to 3, an exemplary embodiment of a sealing element 1 is depicted in different views in perspective representations. The sealing element 1 has an integral form and is formed for arrangement inside an assembly housing of a pressure sensor assembly 2 for a motor vehicle for crash detection.

FIG. 1 shows a perspective representation of the sealing element 1 in a view from below. The sealing element 1 has a through-recess 3 running in an axial direction and comprises a main body 4 substantially formed as a hollow cylinder having an outer peripheral wall 5 and an inner peripheral wall 6 surrounding the through-recess 3, as well as having a lower axial end 7 and an upper axial end 8. In this case, the inner peripheral wall 6 of the main body 4 has a first wall section 9 widening conically towards the lower axial end 7. That is to say, the first wall section 9 of the inner peripheral wall 6 of the main body 4 is arranged on the lower axial end 7 of the main body 4.

In this case, the first wall section 9 forms a contact surface 10 for contact with a pressure sensor housing 11 of a pressure sensor unit 12 arranged inside the assembly house. In the assembled state, at least sections of the pressure sensor housing 11 thus rest on the contact surface 10.

The first wall section 9 of the main body 4 of the sealing element 1 which widens conically towards the lower axial end 7, in the unassembled state, makes possible a sufficiently secure sealing function, wherein, for this purpose, a relatively small corresponding surface on the pressure sensor housing 11 is in contact with the surface of the sealing element 1 and, consequently, is covered or overlaid by the surface of the sealing element 1. In particular, this makes possible a high variability with respect to an installation position of the sealing element 1 in relation to the position of the pressure sensor housing 11 and, in particular, to the position of a pressure supply opening 13 of the pressure sensor housing 11, with which a sufficiently secure sealing function is guaranteed and the covering or overlaying of the pressure supply opening 13 is prevented.

Moreover, the inner peripheral wall 6 of the main body 4 has a second wall section 14 widening conically towards the first wall section 9, wherein the second wall section 14 directly adjoins the first wall section 9. The second wall section 14 has a second opening angle 16 which is smaller with respect to a first opening angle 15 of the first wall section 9. In other words, the first opening angle 15 is thus larger than the second opening angle 16. The first opening angle 15 is 127° and the second opening angle 16 is 63°.

The first opening angle 15 with a value of 127° is particularly suitable for guaranteeing a secure sealing function, wherein, for this purpose, a particularly small corresponding surface on the pressure sensor housing 11 is in contact with the surface of the sealing element 1 and is, consequently, covered by the sealing element 1 in the assembled state. The second opening angle 16 having a value of 63° additionally guarantees that the pressure supply opening 13 is, in the assembled state, not covered or overlaid or is only covered or overlaid to an insignificant extent by the surface of the sealing element 1. Overall, such a configuration consequently further promotes the variability of the installation position of the sealing element 1 and, therefore, a large tolerance range and the probability is further increased that the pressure supply opening 13 is not covered or overlaid by the surface of the sealing element 1 in the assembled state.

Moreover, the main body 4 has an elastic form, as a result of which the sealing element 1 can be braced between the pressure sensor housing 11 and an assembly housing wall of the assembly housing and can therefore be arranged in as fixed a position as possible. In addition, the elastic deformability of the main body 4 further contributes to the fact that the main body 4 in the assembled state of the sealing element 1 is contacted with the pressure sensor housing 11, resulting in a certain deformation, in such a way that the covering or overlaying of the pressure supply opening 13 by the surface of the sealing element 1 is prevented as far as possible or the extent of the coverage or overlaying is at least reduced.

Furthermore, the sealing element 1 comprises a substantially plate-shaped support element 17 which directly adjoins the upper axial end 8 of the main body 4.

The support element 17 has a planar support surface 18 for supporting the sealing element 1 on the assembly housing wall. This can be seen in FIG. 2 on the basis of a perspective representation of the sealing element 1 in a view from above.

In the assembled state of the sealing element 1, the support element 17 with its support surface 18 consequently rests, in a sealing manner, on the assembly housing wall which is likewise configured in particular in a planar manner in the region of the support surface 18.

As can likewise be clearly seen in FIG. 2, the support element 17 has a square basic shape having rounded corners, wherein the section of the through-recess 3 of the sealing element 1 running through the support element 17 lies in the center of the support element 17. Such a configuration makes the support element 17 and, therefore, the sealing element 1 as a whole relatively simple and inexpensive to manufacture and assemble.

The through-recess 3 has, in the support element 17, a first inlet section 19 which widens conically towards the support surface 18. In this case, a third opening angle 20 of the first inlet section 19 is 125°. This represents a particularly suitable compromise between a sufficiently secure sealing function and a sufficiently large tolerance range with regard to production and installation tolerances.

The through-recess 3 in the support element 17 in a second inlet section 21 is additionally configured as a cylindrical bore, wherein the second inlet section 21 adjoins the upper axial end 8 of the main body 4. In this case, the second inlet section 21 lies directly between the first inlet section 19 of the support element 17 and the second wall section 14 of the main body 4, as a result of which the cylindrical bore consequently fluidically connects the first inlet section 19 of the support element 17 with the section of the through-recess 3 formed in the main body 4.

In the assembled state of the sealing element, the first inlet section 19 faces the assembly housing wall in such a way that the first inlet section 19 faces an outlet opening of a pressure channel that passes through the assembly housing wall and fluidically connects a pressure inlet of the assembly housing with the through-recess 3 of the sealing element 1, wherein the outlet opening of the pressure channel and the first inlet section 19 of the through-recess 3 lie coaxially with respect to one another.

The configuration of the through-recess 3 in the support element 17 makes it possible for the air pressure to be reliably supplied from the pressure inlet of the assembly housing via the through-recess 3 of the sealing element 1 to the pressure sensor unit 12 within a large tolerance range with regard to production and installation tolerances.

Essential structural configurations of the sealing element 1 are again clearly depicted in FIG. 3, on the basis of a perspective representation of the sealing element 1 in a cross-section.

The substantially hollow cylindrical main body 4 and the substantially plate-shaped support element 17, which directly adjoins the upper axial end 8 of the main body 4, as well as the through-recess 3 running in an axial direction can be seen here.

In addition, the first wall section 9, which widens conically towards the lower end 7, and the second wall section 14, which widens conically towards the first wall section 9, of the inner peripheral wall 6 of the main body 4 can be clearly seen. The first opening angle 15 of the first wall section 9 at 127° is obviously larger than the second opening angle 16 of the second wall section 14 at 63°.

The first inlet section 19, which widens conically towards the support surface 18 of the support element 17, and the second inlet section 21 of the through-recess 3 in the support element 17, which is configured as a cylindrical bore, can also be seen.

Figure 4:
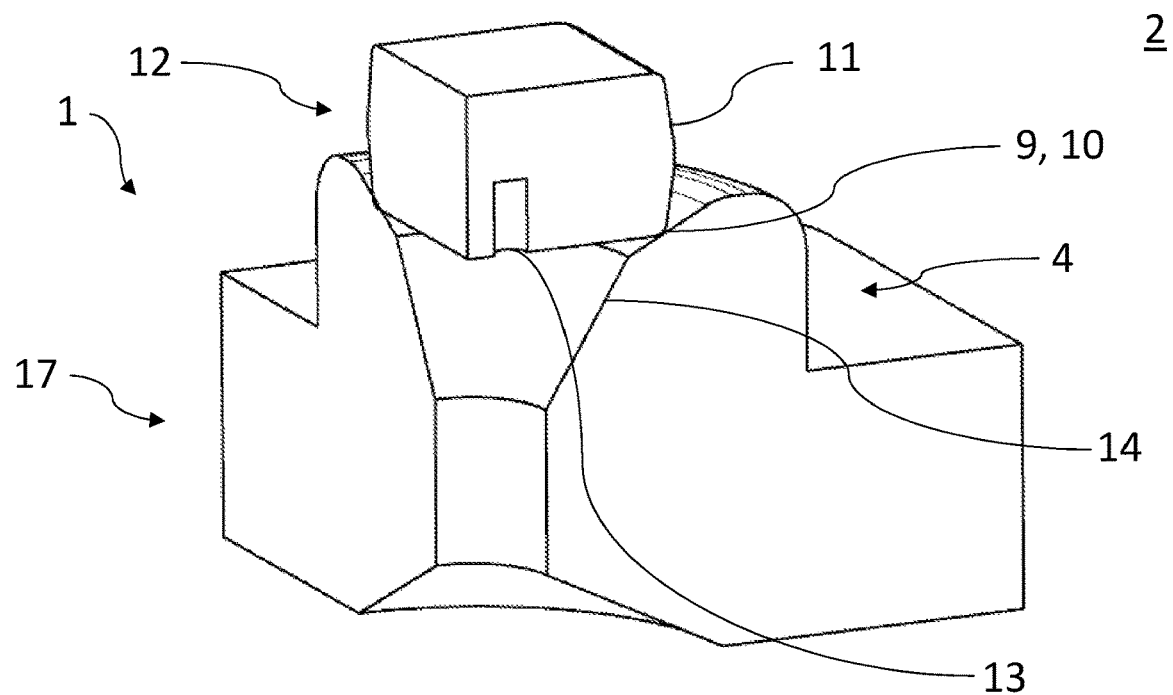
FIG. 4 shows a perspective sectional representation of a pressure sensor assembly with an integrated sealing element according to FIGS. 1 to 3.

FIG. 4 shows a perspective sectional representation of a pressure sensor assembly 2 having an integrated sealing element 1 according to FIGS. 1 to 3.

The pressure sensor assembly 2 for a motor vehicle for crash detection comprises a schematically depicted pressure sensor unit 12 inside a module housing (not depicted), wherein the pressure sensor unit 12 has a sensing element (not depicted) arranged inside a pressure sensor housing 11 for detecting an air pressure in the interior of a vehicle side door. The pressure sensor housing 11 has a pressure supply opening 13 for supplying the air pressure from a pressure inlet of the module housing to the sensing element, wherein the sealing element 1 for sealing the pressure supply opening 13 in relation to the inside of the module housing is arranged between the pressure sensor housing 11 and a module housing wall (not depicted) in such a way that the sealing element 1 encloses the pressure supply opening 13 and fluidically connects the pressure inlet with the pressure supply opening 13.

In this case, sections of the pressure sensor housing 11 rest on the contact surface 10 of the main body 4 of the sealing element 1, which contact surface is formed by the first wall section 9, as a result of which a sufficiently secure sealing function is guaranteed, stressing a relatively small surface on the pressure sensor housing 11, which is in contact with the surface of the sealing element 1. This makes possible a high variability with respect to the installation position of the sealing element 1 in relation to the position of the pressure sensor housing 11 and, in particular, to the position of the pressure supply opening 13 of the pressure sensor housing 11, with which a sufficiently secure sealing function is guaranteed and covering or overlaying of the pressure supply opening 13 is prevented. The second wall section 14 of the main body 4 of the sealing element 1 additionally contributes to the fact that the pressure supply opening 13 is not covered or overlaid by the surface of the sealing element 1.

Moreover, the planar support surface 18 of the support element 17 of the sealing element 1 rests in a sealing manner on the assembly housing wall. The first inlet section 19 of the through-recess 3, which widens conically towards the support surface 18, faces the assembly housing wall in such a way that the first inlet section 19 faces an outlet opening (not depicted) of a pressure channel (not depicted) that passes through the assembly housing wall and fluidically connects a pressure inlet of the assembly housing with the through-recess 3 of the sealing element 1, wherein the outlet opening of the pressure channel and the first inlet section 19 of the through-recess 3 lie coaxially with respect to one another. The configuration of the through-recess 3 in the support element 17 makes it possible for the air pressure to be reliably supplied from the pressure inlet of the assembly housing via the through-recess 3 of the sealing element 1 to the pressure sensor unit 12 within a large tolerance range with regard to production and installation tolerances.

Thanks to the elastic form of the main body 4, the sealing element 1 is braced between the pressure sensor housing 11 and the assembly housing wall with a certain elastic deformation, in particular of the main body 4, and is therefore arranged in a fixed position. In addition, the elastic deformation, in particular of the main body 4, further contributes to the main body 4 being contacted with the pressure sensor housing 11 in such a way that the covering or overlaying of the pressure supply opening 13 by the surface of the sealing element 1 is prevented.

The invention claimed is:

1. A sealing element for a pressure sensor assembly for a motor vehicle, the sealing element comprising:
   a main body, the main body comprising:
      a cylindrical bore disposed in an axial direction of the main body;
      an inlet coupled to a first end of the cylindrical bore, the inlet widening conically in the axial direction from the first end of the cylindrical bore; and
      a wall coupled to a second end of the cylindrical bore opposite the first end of the cylindrical bore, the wall comprising:
         a first wall section coupled to the second end of the cylindrical bore, the first wall section widening conically from the second end of the cylindrical bore at a first angle relative to a plane parallel to and passing through the second end of the cylindrical bore in the axial direction; and
         a second wall section coupled to the first wall section, the second wall section widening conically from the first wall section at a second angle relative to the plane in the axial direction, wherein the second angle is greater than the first angle.

2. The sealing element according to claim 1, wherein the wall comprises:
   an inner wall coupled to the cylindrical bore, the inner wall comprising the first wall section and the second wall section, and the second wall section comprising a contact surface configured to contact a pressure sensor of the pressure sensor assembly; and
   an outer wall coupled to the contact surface, the outer wall extending between an upper axial end and a lower axial end of the main body.

3. The sealing element according to claim 2 wherein the outer wall is formed as an outer peripheral wall and the inner wall is formed as an inner peripheral wall.

4. The sealing element according to claim 1, wherein the second angle is 90° to 160°, and
   wherein the first angle is 30° to 90°.

5. The sealing element according to claim 4, wherein the second angle is 120° to 135°.

6. The sealing element according to claim 5, wherein the first angle is 55° to 70°.

7. The sealing element according to claim 1, wherein the main body has an elastic form.

8. The sealing element according to claim 1, wherein the main body comprises a substantially plate-shaped support element which has a planar support surface for supporting the sealing element on a housing wall of the pressure sensor assembly.

9. The sealing element according to claim 8, wherein the substantially plate-shaped support element adjoins an upper axial end of the main body.

10. The sealing element according to claim 9, wherein the substantially plate-shaped support element has a substantially rectangular shape.

11. The sealing element according to claim 1, wherein the inlet widening conically in the axial direction from the first end of the cylindrical bore comprises the inlet widening conically at a third angle in the axial direction from the first end of the cylindrical bore, and
   wherein of the angle is 90° to 160°.

* * * * *